(12) United States Patent
Schroeder

(10) Patent No.: US 7,463,244 B2
(45) Date of Patent: Dec. 9, 2008

(54) OPTICAL MOUSE AND METHOD FOR REMOVING CONTAMINANTS IN AN OPTICAL MOUSE

(75) Inventor: Dale Schroeder, Scotts Valley, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 629 days.

(21) Appl. No.: 11/133,652

(22) Filed: May 19, 2005

(65) Prior Publication Data
US 2006/0262093 A1    Nov. 23, 2006

(51) Int. Cl.
*G09G 5/08* (2006.01)
(52) U.S. Cl. .................. 345/166; 345/156; 345/157; 345/163
(58) Field of Classification Search .......... 345/156, 345/157, 163, 166
See application file for complete search history.

(56) References Cited

U.S. PATENT DOCUMENTS

| | | | |
|---|---|---|---|
| 5,274,361 A * | 12/1993 | Snow | .......... 345/166 |
| 5,341,229 A | 8/1994 | Rowan | |
| 5,879,626 A | 3/1999 | Watterson et al. | |
| 6,181,367 B1 | 1/2001 | McGrew et al. | |
| 6,869,185 B2 | 3/2005 | Kaminsky et al. | |
| 6,937,221 B2 | 8/2005 | Lippert et al. | |
| 7,142,188 B2 | 11/2006 | Tsumura et al. | |
| 2003/0155001 A1 | 8/2003 | Dieter et al. | |
| 2005/0206614 A1 * | 9/2005 | Brosnan et al. | ............. 345/156 |
| 2005/0206617 A1 * | 9/2005 | Moyer et al. | ................. 345/163 |
| 2007/0085832 A1 * | 4/2007 | Ertel et al. | ................... 345/166 |

FOREIGN PATENT DOCUMENTS

| | | |
|---|---|---|
| GB | 2022993 | 12/1979 |
| GB | 2387428 | 10/2003 |
| JP | 03126909 | 5/1991 |
| JP | 06154155 | 6/1994 |

* cited by examiner

Primary Examiner—Richard Hjerpe
Assistant Examiner—Jennifer T Nguyen

(57) ABSTRACT

Optical device and a method for cleaning an optical surface on an optical device. An optical device has a device body and at least one optical surface on the device body. At least one access port on the device body is at a location on the device body laterally spaced from the at least one optical surface. At least one guide channel extends through the device body from the at least one access port toward the at least one optical surface for guiding a cleaning fluid injected into the device body through the at least one access port through the device body to the at least one optical surface to clean the at least one optical surface. The optical device can be an optical pointing device such as an optical computer mouse, or another device having an optical surface to be cleaned.

22 Claims, 2 Drawing Sheets

OPTICAL MOUSE AND METHOD FOR REMOVING CONTAMINANTS IN AN OPTICAL MOUSE

DESCRIPTION OF RELATED ART

An optical pointing device, such as an optical computer mouse, directs movement information to a graphical user interface (GUI) of a computer by tracking relative movement between a navigation surface, such as a mouse pad or a desk top, and an electronic image sensor within the optical pointing device. Light is radiated onto the navigation surface by a light source that is also within the optical pointing device, and based on the illumination of the navigation surface; images are obtained using the electronic image sensor. In particular, the electronic image sensor typically contains an array of photodetectors arranged in a pattern. Each photodetector in the array creates an output signal proportional to the intensity of light impinging on that photodetector. The output signals from the individual photodetectors in the photodetector array are processed to generate an image of the navigation surface. By comparing a series of these images over time, the optical pointing device develops information about movement of the device relative to the navigation surface. This movement information, after processing, enables a corresponding movement of a pointer on the graphical user interface of the computer.

Some optical pointing devices use a coherent light source, for example, a laser, to illuminate the navigation surface. Although coherent light sources usually enable lower power consumption and more accurate and precise optical navigation, coherent illumination systems also tend to be more sensitive to the presence of contaminants, such as particles of dust, dirt, food and other substances. In contrast, optical pointing devices that use a non-coherent light source, such as a light-emitting diode (LED), are relatively unaffected by contaminants because they employ diffuse light patterns which cause the contaminants to remain out of focus in the images.

In coherently illuminated optical pointing devices, once a contaminant becomes affixed to an optical surface of the device, for example, a surface of an illuminating lens or an imaging lens, and is coherently illuminated, the contaminant becomes a fixed pattern on the image of the navigation surface. For example, with a contaminant present, one or more photodetectors of the photodetector array will generate a fixed output signal having an intensity or location that does not correspond to an actual surface feature or light pattern on the navigation surface. This fixed pattern acts as noise, distorting image comparison and thereby inhibiting accurate tracking of movement of the optical pointing device relative to the navigation surface.

Unfortunately, contaminants are essentially unavoidable in normal environments, such as at home or in an office, where an optical computer mouse is likely to be used; and because of the sensitivity of an optical computer mouse to dust and other contaminants, it is desirable to periodically clean optical surfaces on the mouse, for example, surfaces of illuminating and imaging lenses on the mouse. A known method for cleaning lens surfaces on an optical mouse is to use a container of cleaning fluid sold primarily for the purpose of dusting photographic slides. The container includes a tube that extends from an end of the container and that can be aimed toward the lenses on the mouse to blow dust off the lens surfaces.

The optical components on an optical mouse, however, are usually located within a recess extending into the body of the mouse, and, as a result, are often difficult to clean. In particular, it is difficult to correctly aim the container tube at the lenses without touching the lens surfaces or otherwise damaging the lenses. In addition, because the lenses are recessed, the cleaning fluid must often be directed toward the lenses in a direction generally perpendicular to the lens surfaces. This does not permit the lenses to be cleaned very effectively, and, in fact, can actually cause dust to be pulled from the surrounding air into the mouse.

SUMMARY OF THE INVENTION

In accordance with the invention, an optical device and a method for cleaning an optical surface on an optical device is provided. An optical device has at least one access port at a location on the device body that is laterally spaced from an optical surface to be cleaned. At least one guide channel extends through the device body from the at least one access port toward the optical surface for guiding a cleaning fluid injected into the device body through the at least one access port to the optical surface to clean the optical surface. The optical device can be an optical pointing device such as an optical computer mouse, or another device having an optical surface to be cleaned.

BRIEF DESCRIPTION OF THE DRAWINGS

Furthermore, the invention provides embodiments and other features and advantages in addition to or in lieu of those discussed above. Many of these features and advantages are apparent from the description below with reference to the following drawings.

DETAILED DESCRIPTION OF THE EXEMPLARY EMBODIMENTS OF THE INVENTION

Embodiments in accordance with the invention provide an optical device and a method for cleaning an optical surface on the optical device.

Figure 1:
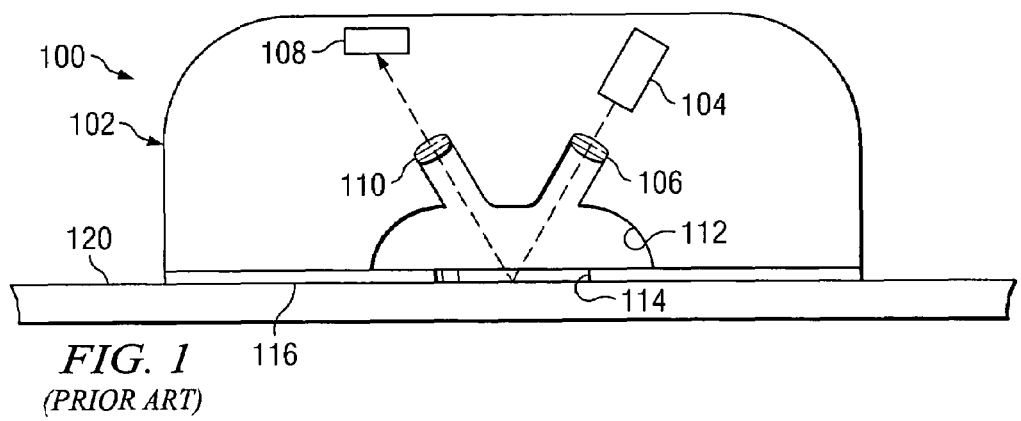
FIG. 1 is a schematic, cross-sectional side view of an optical computer mouse that is known in the art to assist in explaining the present invention.

FIG. 1 is a schematic, cross-sectional side view of an optical computer mouse that is known in the art to assist in explaining the present invention. The optical computer mouse is generally designated by reference number 100 and includes mouse body 102 containing light source 104, illuminating lens 106, image sensor 108 and imaging lens 110, all of which are supported internally of mouse body 102 within recess 112 formed in mouse body 102. As will be appreciated by those skilled in the art, optical mouse 100 also includes other components that are not necessary for a complete understanding of the invention; and, thus, are not illustrated in FIG. 1 and are not described herein.

Optical mouse 100 functions to direct movement information to a graphical user interface (GUI) of a computer by tracking relative movement between a navigation surface 120, such as a mouse pad or a desk top, and image sensor 108. As shown by the dashed lines in FIG. 1, light is optically radiated onto navigation surface 120 by light source 104 illuminating navigation surface 120 through illuminating lens 106 and light path opening 114 on the bottom surface 116 of mouse body 102. The light radiated onto navigation surface 120 is reflected by navigation surface 120, and imaged by imaging lens 110 onto image sensor 108. Image sensor 108 typically contains an array of photodetectors arranged in a pattern. Each photodetector in the array creates an output signal that is proportional to the intensity of the light impinging on that photodetector. The output signals from each photodetector in the photodetector array are processed to generate an image of the navigation surface. By comparing a series of these images over time, optical mouse 100 develops information about movement of the optical mouse relative to the navigation surface. This movement information, after processing, enables a corresponding movement of a pointer on the graphical user interface of the computer.

Particularly when light source 104 is a coherent light source, such as a laser, if a contaminant such as dust becomes affixed to an optical surface on the optical mouse, for example, on the surface of illuminating lens 106 or imaging lens 110, the contaminant becomes a fixed pattern on the image of the navigation surface formed on image sensor 108. For example, with a contaminant present, one or more photodetectors of the photodetector array of image sensor 108 will generate a fixed output signal having an intensity or location that does not correspond to an actual surface feature or light pattern on navigation surface 120. This fixed pattern acts as noise, distorting image comparison and thereby inhibiting accurate tracking of movement of the optical mouse relative to the navigation surface.

Figure 2:
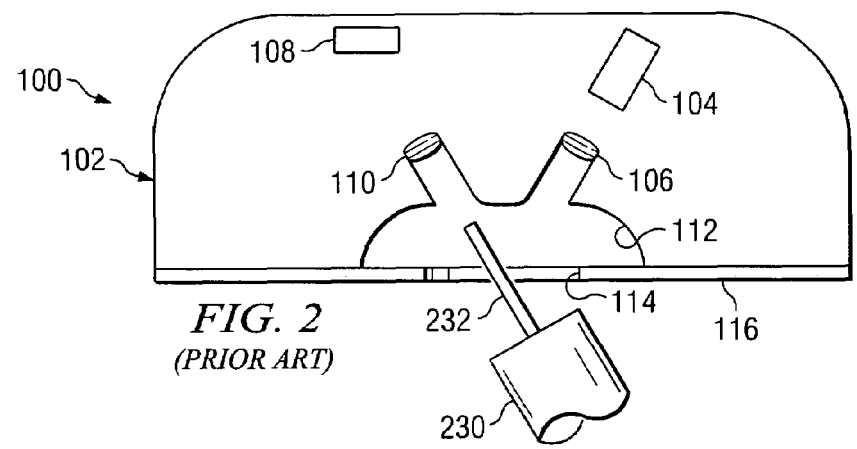
FIG. 2 illustrates the optical computer mouse of FIG. 1 and a known mechanism for cleaning optical surfaces on the optical computer mouse to assist in explaining the present invention.

Because of the sensitivity of an optical mouse to dust and other contaminants, it is desirable to periodically clean optical surfaces on the mouse, such as surfaces of illuminating and imaging lenses 106 and 110. A known method to clean dust off optical surfaces of an optical mouse is schematically illustrated in FIG. 2. In particular, FIG. 2 illustrates optical computer mouse 100 of FIG. 1 and a known mechanism for cleaning optical surfaces on the optical computer mouse to assist in explaining the present invention.

As shown in FIG. 2, container 230 of a cleaning fluid, for example, a can of a liquid, such as 1,1,1,2-Tetrafluoroethane, having a boiling point that is less than room temperature, sold primarily for the purpose of dusting photographic slides, is being used to remove contaminants from the surface of imaging lens 110. In particular, narrow tube 232 extends from an end of container 230 and is aimed by a user (not shown) toward imaging lens 110 in order to blow dust and other contaminants off of the surface of the lens.

As shown in FIG. 2, because lenses 106 and 110 are located within recess 112 in mouse body 102, tube 232 must be inserted into recess 112 through light path opening 114 in order to direct the cleaning fluid onto the surface of lens 110. By inserting the tube into the mouse body, however, it becomes difficult to properly aim the tube at the lens without scratching the lens surface or otherwise damaging the lens.

In addition, because lenses 106 and 110 are recessed within mouse body 102, the cleaning fluid dispensed from can 230 through tube 232 must be directed toward the lenses in a direction generally perpendicular to the lens surfaces as shown in FIG. 2. This does not permit the lens surfaces to be cleaned very effectively, and, in fact, can cause dust and other contaminants to be pulled from the surrounding air into the mouse.

Figure 3:
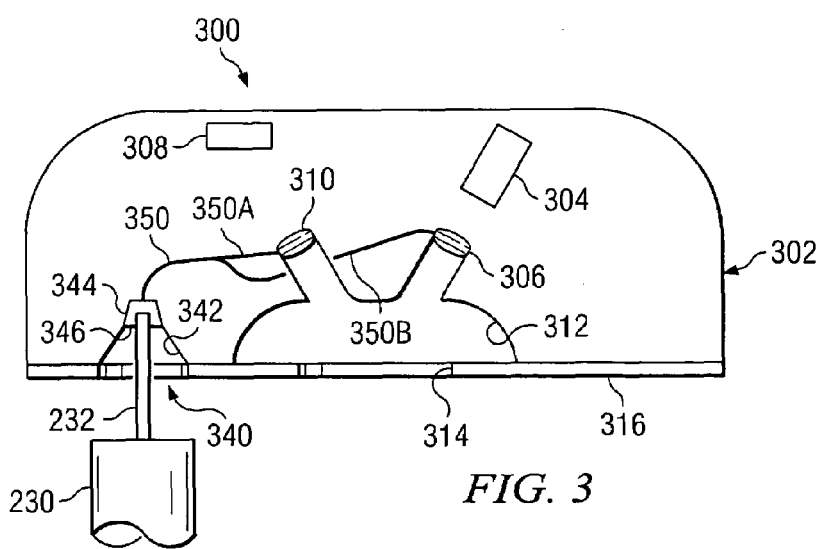
FIG. 3 is a schematic, cross-sectional side view of an optical computer mouse and a mechanism for cleaning optical surfaces on the optical computer mouse according to an exemplary embodiment in accordance with the invention.

FIG. 3 is a schematic, cross-sectional side view of an optical computer mouse and a mechanism for cleaning optical surfaces on the optical computer mouse according to an exemplary embodiment in accordance with the invention. The optical computer mouse is designated by reference number 300, and is generally similar to optical computer mouse 100 in FIG. 1 in that it includes mouse body 302 containing light source 304, illuminating lens 306, image sensor 308 and imaging lens 310, all of which are supported within recess 312 extending into mouse body 302 from light path opening 314 in bottom surface 316 of the mouse body.

Figure 4:
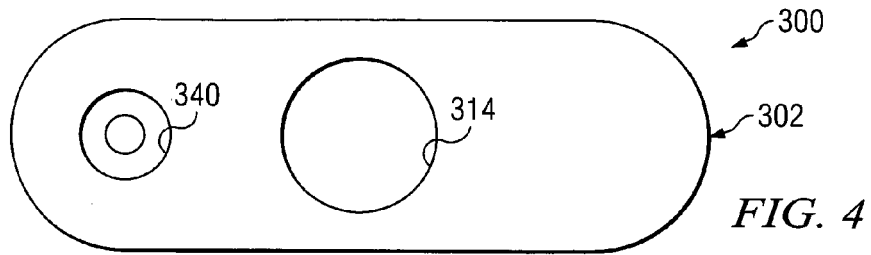
FIG. 4 is a bottom view of the optical computer mouse illustrated in FIG. 3.

Optical mouse 300 differs from optical mouse 100, however, in that it further includes an access port 340 extending into mouse body 302 from bottom surface 316. As shown in FIG. 3 and in FIG. 4, which is a bottom view of optical computer mouse 300 illustrated in FIG. 3, access port 340 is located at a position on bottom surface 316 of mouse body 302 that is laterally spaced from light path opening 314 and from lenses 306 and 310. Access port 340 is sized to receive the end of tube 232 extending from the end of compressed gas container 230 as shown in FIG. 3.

In addition, a channel 350 is formed in optical mouse body 302 that extends from access port 340 to recess 312. In particular, as shown in FIG. 3, channel 350 splits into two channel portions 350A and 350B. Channel portion 350A opens into recess 312 in the vicinity of illuminating lens 306 and channel portion 350B opens into cavity 312 in the vicinity of imaging lens 310. Channel 350 is adapted to receive cleaning fluid injected from container 230 into mouse body 302 through access port 340 and to guide the cleaning fluid through the mouse body onto the surfaces of lenses 306 and 310 in order to blow contaminants off of the surfaces to thereby clean the surfaces.

The cleaning procedure illustrated in FIG. 3 provides several advantages over known cleaning methods such as the cleaning procedure illustrated in FIG. 2. Initially, in the cleaning procedure illustrated in FIG. 3, the end of tube 232 is positioned remotely from the surfaces of lenses 306 and 310 during a cleaning operation. As a result, contact of the lens surfaces by the end of the tube is prevented, ensuring that the lens surfaces cannot be scratched or otherwise damaged during cleaning.

In addition, in optical mouse 300, channel portions 350A and 350B direct cleaning fluid onto and across lens surfaces 306 and 310 in a direction that is generally transverse to the lens surfaces. As a result, the cleaning fluid will, after striking the lens surfaces, deflect off of the lens surfaces in a generally transverse direction, so as to effectively carry contaminants away from the lenses. In the cleaning procedure illustrated in FIG. 2, on the other hand, as described previously, the cleaning fluid is usually directed toward the lenses in a direction generally perpendicular to the lens surfaces, which does not permit the lenses to be fully cleaned, and, in fact, can actually cause contaminants to be pulled from the surrounding air into the mouse.

As shown in FIG. 3, access port 340 includes an inwardly tapered portion 342 that extends from bottom surface 316 of mouse body 302, and a cylindrical portion 344 extending into the mouse body from tapered portion 342. Tapered portion 342 helps guide the end of tube 232 into cylindrical portion 344 to properly align tube 232 with guide channel 350. An annular dust seal 346 of rubber or another suitable material is positioned in access port 340 to prevent contaminants from entering the mouse through access port 340 both during normal use of the optical mouse and during a cleaning operation.

In general, an optical device according to the invention can be designed in numerous ways to best accommodate the user and the particular design of the device. For example, although optical mouse 300 in FIG. 3 includes a single access port and a guide channel positioned to guide cleaning fluid onto the surfaces of two lenses, other exemplary embodiments in accordance with the invention can include a plurality of guide channels extending from a plurality of access ports to guide cleaning fluid to optical surfaces positioned at different locations in the optical device. In addition, the access ports can be located on surfaces other than the bottom surface of the optical device if desired or appropriate for a particular device design.

Figure 5:
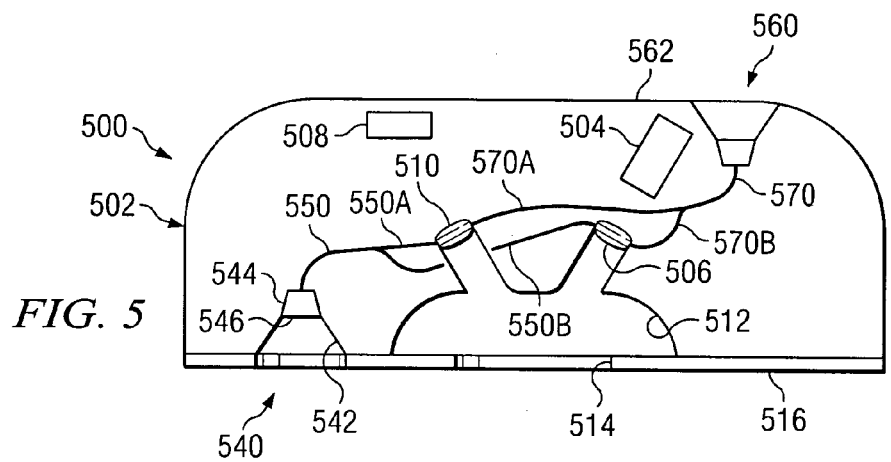
FIG. 5 is a schematic, cross-sectional side view of an optical computer mouse according to a further exemplary embodiment in accordance with the invention.

FIG. 5 is a schematic, cross-sectional side view of an optical computer mouse according to a further exemplary embodiment in accordance with the invention. The mouse is designated by reference number 500, and is generally similar to mouse 300 in FIG. 3 and utilizes corresponding reference numbers to identify corresponding components. Optical mouse 500 differs from optical mouse 300, however, in that it includes second access port 560 in upper surface 562 thereof that is also at a location on mouse body 502 that is laterally spaced from light path opening 514 and from lenses 506 and 510. Guide channel 570 having guide channel portions 570A and 570B extends from access port 560 and will guide cleaning fluid onto the surfaces of lenses 506 and 510 in a direction that is substantially opposite to the direction of fluid flow from guide channels 540A and 540B.

Optical mouse 500, by enabling cleaning fluid to be directed across the surfaces of lenses 506 and 510 from different directions, is particularly desirable for optical surface shapes that cannot be fully cleaned by directing cleaning fluid from a single direction. In other exemplary embodiments in accordance with the invention, separate guide channels can also be positioned to guide cleaning fluid to different optical surfaces on an optical device.

Optical mice 300 in FIG. 3 and 500 in FIG. 5 are highly schematic illustrations of optical mice to help explain the invention. Optical mice are available in numerous different designs and shapes, and cleaning channels can be formed in numerous different ways to accommodate the different mouse designs.

Figure 6:
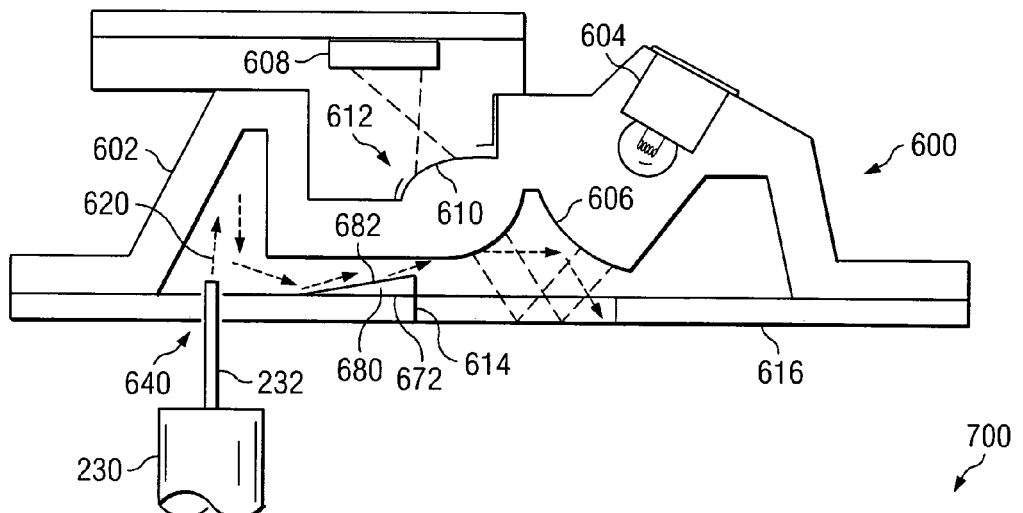
FIG. 6 is a schematic, cross-sectional side view of an optical computer mouse according to a further exemplary embodiment in accordance with the invention.

FIG. 6 is a cross-sectional side view of an optical computer mouse according to a further exemplary embodiment in accordance with the invention. The computer mouse is designated by reference number 600 and generally illustrates the geometry of a known optical mouse. Optical mouse 600 includes light source 604, illuminating lens 606, image sensor 608 and imaging lens 610, all of which are supported within recess 612 extending into mouse body 602 from bottom surface 616 thereof. Mouse 600 also includes a channel 620 provided therein that opens into recess 612.

According to an exemplary embodiment in accordance with the invention, access port 640 is provided in optical mouse 600 that extends into mouse body 602 from bottom surface 616 thereof and opens into channel 620. In addition, a small, wedge-shaped element 680 having inclined surface 682 is positioned in channel 620 for guiding cleaning fluid flowing through channel 620 from access port 640 across the surfaces of lenses 606 and 610. Accordingly, when tube 232 of cleaning fluid container 230 is inserted into access port 630, and cleaning fluid is injected through access port 630, the fluid will be guided through channel 620, over inclined surface 682 of wedge 680 and across the surfaces of lenses 606 and 610. As also shown in FIG. 6, wedge-shaped element 680 also functions to narrow channel 620 somewhat to increase the velocity of the fluid flowing through the channel so as to more effectively clean the lens surfaces. After cleaning the lens surfaces, the cleaning fluid will be directed out of the mouse body through light path opening 614 to remove contaminants blown off of the lens surfaces out of the mouse body.

Optical mouse 600 in FIG. 6 is intended to illustrate an example of how an existing optical mouse design can be readily modified to incorporate a lens cleaning capability. It should be understood, however, that different optical mouse designs may require different modifications, and it is not intended to limit the invention to any particular optical mouse design.

Figure 7:
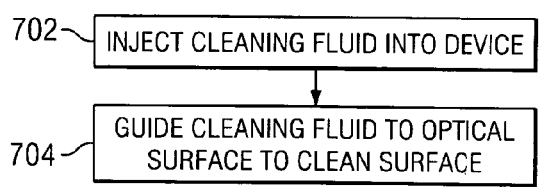
FIG. 7 is a flowchart that illustrates a method for cleaning at least one optical surface on an optical device according to a further exemplary embodiment in accordance with the invention.

FIG. 7 is a flowchart that illustrates a method for cleaning at least one optical surface on an optical device according to a further exemplary embodiment in accordance with the invention. The method is generally designated by reference number 700, and begins by injecting a cleaning fluid into an optical device at a location laterally spaced from at least one optical surface on the device (Step 702). The cleaning fluid is then guided through the optical device onto the at least one optical surface to clean the at least one optical surface (Step 704).

While what has been described constitute exemplary embodiments in accordance with the invention, it should be recognized that the invention can be varied in numerous ways without departing from the scope thereof. For example, although the invention is described primarily in connection with an optical computer mouse, it should be understood that the invention is not so limited. The invention can also be used to clean optical surfaces on a variety of optical devices such as cameras, slide holders and the like. In addition, although the invention is described primarily in connection with cleaning lens surfaces, the invention can also be used to clean other types of optical surfaces such as mirrors, image sensor surfaces and the like. Furthermore, it should be understood that the terms "optical device" and "optical surface" as used herein are not intended to be limited to devices and surfaces for visible light, but can include devices and surfaces for use in connection with any form of electromagnetic radiation. Yet further, although the invention is described primarily in connection with cleaning optical surfaces by using a cleaning fluid, such as 1,1,1,2-Tetrafluoroethane, having a boiling point that is less than room temperature, other cleaning fluids such as clean, dry compressed air can also be used, and the invention is not limited to use of any particular cleaning fluid. Because embodiments in accordance with the invention can be varied in numerous ways, it should be understood that the invention should be limited only insofar as is required by the scope of the following claims.

I claim:

1. An optical device, comprising:
    a device body;
    at least one optical surface on the device body;
    at least one access port on the device body at a location on the device body laterally spaced from the at least one optical surface; and
    at least one guide channel in the device body extending from the at least one access port toward the at least one optical surface for guiding a cleaning fluid injected into the device body through the at least one access port through the device body to the at least one optical surface to clean the at least one optical surface.

2. The optical device according to claim 1, wherein the at least one guide channel guides the cleaning fluid substantially transversely across the at least one optical surface.

3. The optical device according to claim 1, wherein at least one of the at least one guide channel includes channel narrowing structure for narrowing a portion of the guide channel for increasing a velocity of the cleaning fluid guided through the guide channel.

4. The optical device according to claim 1, wherein the at least one access port comprises a plurality of access ports at different locations on the device body laterally spaced from the at least one optical surface, and wherein the at least one guide channel comprises a plurality of guide channels, each extending from one of the plurality of access ports to at least one of the at least one optical surface.

5. The optical device according to claim 4, wherein the plurality of guide channels guide cleaning fluid from the plurality of access ports to at least one of the at least one optical surface from different directions.

6. The optical device according to claim 1, wherein the at least one optical surface comprises at least one lens surface.

7. The optical device according to claim 6, wherein the optical device comprises an optical pointing device.

8. The optical device according to claim 7, wherein the optical pointing device comprises an optical computer mouse.

9. The optical device according to claim 8, wherein the at least one optical surface comprises at least one of an illuminating lens and an imaging lens.

10. The optical device according to claim 1, and further including a seal for normally closing each at least one access port.

11. The optical device according to claim 8, wherein the optical computer mouse further includes a light path opening in a bottom surface of the device body, and wherein at least one of the at least one access port is in the bottom surface of the optical computer mouse at a location laterally spaced from the light path opening.

12. A method for cleaning an optical surface on an optical device, comprising:
    injecting a cleaning fluid into the device at at least one location on the device that is laterally spaced from at least one optical surface; and
    guiding the cleaning fluid through the optical device from the at least one location to the at least one optical surface to clean the at least one optical surface.

13. The method according to claim 12, wherein guiding the cleaning fluid through the optical device from the at least one location to the at least one optical surface to clean the at least one optical surface comprises:
    guiding the cleaning fluid through the optical device from the at least one location to the at least one optical surface in a direction substantially transverse to the at least one optical surface.

14. The method according to claim 12, wherein injecting a cleaning fluid into the optical device at at least one location on the device that is laterally spaced from the at least one optical surface comprises:
    injecting 1,1,1,2-Tetrafluoroethane into the optical device.

15. The method according to claim 12, wherein the optical device comprises an optical computer mouse, and wherein guiding the cleaning fluid through the optical device from the at least one location to the at least one optical surface to clean the at least one optical surface comprises:
    guiding the cleaning fluid substantially transversely across at least one lens surface on the optical mouse to clean the at least one lens surface.

16. An optical computer mouse, comprising:
    a mouse body;
    at least one optical surface on the mouse body;
    at least one access port in the mouse body at a location on the mouse body laterally spaced from the at least one optical surface; and
    at least one guide channel in the mouse body for guiding a cleaning fluid injected into the mouse body through the at least one access port through the mouse body to the at least one optical surface to clean the at least one optical surface.

17. The optical computer mouse according to claim 16, wherein the at least one optical surface comprises at least one lens surface.

18. The optical computer mouse according to claim 16, wherein the at least one lens surface comprises at least one of an illuminating lens and an imaging lens.

19. The optical computer mouse according to claim 16, wherein the at least one guide channel includes a narrowed portion for increasing the velocity of the cleaning fluid guided through the guide channel.

20. The optical computer mouse according to claim 16, wherein the optical computer mouse further includes a light path opening in a bottom surface of the device body, and wherein at least one of the at least one access port is in the bottom surface of the optical computer mouse at a location laterally spaced from the light path opening.

21. A system for cleaning an optical surface on an optical device, comprising: an optical device, comprising:
    a device body;
    at least one optical surface on the device body;
    at least one access port in the device at a location on the device body laterally spaced from the at least one optical surface; and
    at least one guide channel in the device body extending from the at least one access port toward the at least one optical surface for guiding a cleaning fluid injected into the device body through the at least one access port through the device body to the at least one optical surface to clean the at least one optical surface; and
    a container of cleaning fluid for injecting cleaning fluid into the at least one guide channel through the at least one access port.

22. The system according to claim 21, wherein the container of cleaning fluid comprises 1,1,1,2-Tetrafluoroethane.

* * * * *